United States Patent Office 3,211,808
Patented Oct. 12, 1965

3,211,808
COATING COMPOSITIONS OF LOW MOLECULAR WEIGHT POLYETHYLENE AND GRAFT COPOLYMERS OF POLYMERIZABLE ACRYLIC ACIDS AND POLYETHYLENE
Lewis J. Young, Sanford, and Joseph E. Burkholder, Midland, Mich., assignors to The Dow Chemical Company, Midland, Mich., a corporation of Delaware
No Drawing. Filed Sept. 5, 1961, Ser. No. 135,739
6 Claims. (Cl. 260—876)

This invention relates to novel compositions which are intimate mixtures of low molecular weight polyethylene and graft copolymers of acrylic or methacrylic acid and polyethylene. It relates more particularly to mixtures of low molecular weight polyethylene and graft copolymers of a predominant amount of polyethylene and a minor proportion of acrylic or methacrylic acid, such mixtures being particularly suitable for production of smooth, adherent, uniform corrosion resistant coatings for metals.

Graft copolymers consisting of a predominant amount of polyethylene and a minor proportion of acrylic or methacrylic acid provide improved receptibility for dyes and printing inks, and excellent adherence to metal, particularly metal foils. While graft copolymers of polyethylene and polymerizable acrylic compounds usually have excellent adhesion to metals such as iron, stainless steel, aluminum and aluminum foil, and other metals, it is often extremely difficult to obtain smooth, uniform coatings particularly when using fluid-bed coating techniques.

It is a primary object of the invention to prepare thermoplastic compositions suitable for coating. It is a further object to provide thermoplastic compositions of matter suitable for applying smooth, adherent, corrosion resistant coatings to metals and other articles. Still another object is to provide thermoplastic compositions particularly suitable for providing smooth, adherent, corrosion resistant coatings to metals using the fluid-bed method of coating. Other and related objects will appear from the following description of the invention.

According to the invention, new thermoplastic coating compositions having improved flowability and excellent corrosion resistance and adherence, in the form of thin sheet or films, to metals, can be prepared by intimately incorporating with a graft copolymer consisting of (A) from 2 to 25 percent by weight of an unsaturated acid selected from the group consisting of acrylic acid or methacrylic acid and correspondingly, (B) from 98 to 75 percent of polyethylene per 100 parts by weight of the graft copolymer, certain specified amounts of polyethylene resin which is compatible therewith, and has an average molecular weight ranging from about 1500 to about 10,000, as determined by melt viscosity methods described by Sperati, C. A., Franta, W. A., and Starkweather, H. W., Jr., Journal of American Chemical Society, 75, 6129 (1953).

A graft copolymer as the term is well understood in the art, means a base or trunk polymer having chains of a plurality of vinyl or vinylidene monomer units which are capable of addition polymerization, chemically attached to, or combined with, the trunk or base polymer. Pictorially, this can be represented as follows:

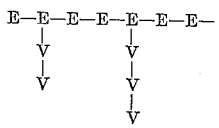

wherein E represents monomer units of the trunk or base polymer and V represents monomer units of the grafted-on vinyl or vinylidene monomer.

The graft copolymers to be employed in the invention are prepared by reacting acrylic acid or methacrylic acid with polyethylene having active centers on the polymer molecules capable of initiating the polymerization of vinyl or vinylidene monomers to form addition polymers. Active centers at which grafting will occur can readily be induced on the polyethylene in known ways, e.g., by subjecting the solid polyethylene to the action of high energy ionizing radiations such as gamma rays, X-rays or high speed electrons, preferably in the presence of air or oxygen, for a dose of from 0.5 to 10 megarads in a field of high energy ionizing radiations of an intensity of at least 40,000 rads per hour or the equivalent thereof.

The radiation dose can be expressed in units of megarads. The "rad" expressing the quantity of radiations of particles of high enegy giving place to an energy absorption of 100 ergs of energy per gram of the absorbing material. The dose can also be expressed in terms of the exposure to radiation, in watt seconds per gram of the material such as is produced by using a Van de Graaff electron accelerator operating at, for example, a current in the tube of 150 to 250 microamperes and an acceleration potential of about 2 million electron volts (mev.).

Alternatively, active sites on the polyethylene at which grafting of the acrylic acid or methacrylic acid will occur can be produced by contacting the solid polymer with ozone, suitably in a gaseous or liquid medium, e.g., air, oxygen or carbon tetrachloride, which is a non-solvent for the polymer, for a period of from a few seconds to several hours depending upon the temperature, whereby active ozonide sites are produced on the polyolefin. The polyethylene is advantageously contacted with a gaseous atmosphere such as air or oxygen containing from 1 to 10 percent by volume of ozone at temperatures between about —20° C. and 160° C. Reaction of the ozone with the polyolefin occurs more readily as the temperature is increased.

The number of the active centers induced on the polyethylene starting material is dependent in part upon the intensity and dose of irradiation or upon the concentration of the ozone and in part upon the temperature at which the activating of the polyolefin is carried out.

The number and the length of the polymer chains of acrylic or methacrylic acid chemically attached to the trunk polyethylene polymer is in turn dependent upon a number of variables among which are the number of active centers on the polymer starting material, the concentration of the grafting monomer and the temperature at which the grafting reaction is carried out.

The grafting reaction can be carried out by contacting the polyethylene containing active centers with the acrylic or methacrylic acid in vapor or liquid form and in the presence or absence of a diluent, which may swell or dissolve the polyolefin.

The grafting reaction can be carried out at temperatures between about 65° C. and 170° C. and at atmospheric, subatmospheric or superatmospheric pressure. The reaction is preferably carried out at temperatures below the crystalline melting point of the polyethylene and in the absence or substantial absence of air or oxygen.

Suitable liquid diluents for carrying out the reaction of the acrylic acid or methacrylic acid with the activated polyolefin are benzene, toluene, xylene, dioxane, hexane, heptane, octane and the like. The reaction is advantageously carried out in a liquid medium employing the acrylic or methacrylic acid and diluent in amount sufficient to form a slurry or mixture with the polyethylene that can conveniently be stirred, and employing the acid in a concentration of from 10 to 50 percent by weight of the sum of the weights of the acid and the diluent initially used.

The graft copolymers to be employed are thermoplastic resinous products consisting of from 2 to 25 percent by weight of acrylic acid or methacrylic acid chemically attached to from 98 to 75 percent of polyethylene per 100 parts by weight of the graft copolymer.

The low molecular weight polymers to be employed can be polyethylene having a molecular weight between about 1500 and about 10,000 as determined by procedures described by Sperati et al., Journal of American Chemical Society, 75, 6129 (1953).

The proportions of graft copolymer and low molecular weight polyethylene relative to one another may be varied widely, depending for the most part upon the molecular weight of the low molecular weight resin.

In general, the low molecular weight polyethylene can be used in amounts ranging from about 10 to about 75 percent by weight of the sum of the weights of the low molecular weight polyethylene and the graft copolymer used being such that the final composition has a flow viscosity of at least 20 poise and not greater than 11,000 poise as measured at a temperature of 225° C. and a pressure of 700,000 dynes/cm.$^2$.

Polyethylene having an average molecular weight of about 1500 can be employed in amounts of from about 10 to about 75 percent by weight of the sum of the weights of the low molecular weight resin and graft copolymer used. Similarly, polyethylene of average molecular weight of about 2000 to about 5000 can be employed in amounts of from 25 to 60 percent by weight of the sum of the weights of the low molecular resin and graft copolymer used, and polyethylene of average molecular weight of about 10,000 can be employed in amounts of from 40 to 75 percent by weight of the sum of the weights of the low molecular weight resin and graft copolymer used.

Concentrations of the low molecular weight polyethylene in excess of the amounts stated herein are incompatible with the graft copolymer used, and as such, prevent the formation of uniform blends. Conversely, addition of less than the stated amounts of low molecular weight polyethylene to the graft copolymer used, will form blends from which discontinuous, granular, coatings are produced.

The effect of the low molecular weight polyethylene resin for increasing the rate of flow of graft copolymers of from 2 to 25 percent by weight of an unsaturated acid selected from the group consisting of acrylic acid and methacrylic acid and correspondingly from 98 to 75 percent by weight of polyethylene, for 100 parts of graft copolymer, during conventional coating application to metals and other articles, with a resultant improvement in surface smoothness and consistency becomes greater as the average molecular weight of the low molecular weight resin decreases. More specifically, a small amount, e.g. 10 percent by weight of polyethylene having an average molecular weight of about 1500 when intimately incorporated with 90 percent by weight of a graft copolymer containing from 2 to 25 percent of acrylic acid or methacrylic acid and correspondingly from 98 to 75 percent by weight of polyethylene polymer per 100 parts by weight of the graft copolymer has an effect of improving the flow rate and resultant smoothness and uniformity of the thermoplastic coating composition which is substantially equivalent to the improvements obtained by incorporating 40 percent by weight of polyethylene having an average molecular weight of 10,000 by weight of the graft coplymer containing from 2 to 25 percent of acrylic or methacrylic acid and correspondingly 98 to 75 percent by weight of polyethylene polymer per 100 parts of graft copolymer.

The compositions consisting essentially of the low molecular weight polyethylene resins and the graft copolymers of acrylic or methacrylic acid and polyethylene, intimately and uniformly incorporated with one another and which compositions have improved flowability resulting in smooth, continuous coatings for articles, particularly metals, during conventional coating application procedures and being particularly useful for fluidized bed coating of metals, can be prepared by intimately mixing and mechanically working the resins with one another on heated compounding rolls, a Banbury mixer or in a plastics extruder.

Substrates suitable for coating with the compositions of this invention include, but are not limited to, cold rolled steel, hot rolled steel, stainless steel, various steel alloys, wrought iron, cast iron, aluminum, aluminum foil, brass, magnesium, glass, wood, paper, cellulosics, cardboard, cement, etc.

The particular substrate to be coated should generally be cleaned prior to the coating process. Descaling, if necessary, may be conveniently accomplished by solvent action or pickling.

The novel coating compositions of this invention can be applied by any conventional coating process including spraying, dipping or flow coating, and are particularly suitable for applying smooth, continuous, corrosion resistant, adherent coatings to metal using fluid-bed coating techniques.

The fluid-bed technique comprises suspending finely divided polymer or copolymer powder in an inert gas, such as nitrogen, to form a fluid-bed. The article to be coated is preheated to a temperature above the melting point of the polymer or copolymer and is then immersed in the fluid-bed for a short period of time. The polymer melts onto the surface of the article to form a continuous film. Post heating is generally required to obtain a coating of optimum uniformity and smoothness. Pre-heating and post-heating temperatures are dependent upon the coating composition being used.

The following examples illustrate ways in which the principle of the invention has been applied, but are not to be construed as limiting its scope.

*Example 1*

(A) Solid linear polyethylene having a melt index of 4 was irradiated in air with high speed electrons from a Van de Graaff generator operating at a beam current of 156 microamperes and 2 mev. potential for a total of dose of 1.6 megarads. The irradiated polyethylene was suspended in a solution of ortho-xylene containing acrylic acid in the ratio of 1.06 parts by weight acrylic acid to 1 part polyethylene. The graft polymerization was carried out in a glass reaction vessel equipped with a reflux condenser and stirrer and under a pre-purified nitrogen gas by heating the mixture for one hour. After completing the reaction, the product was separated by filtering and was washed with hot water to remove homopolymer and unreacted acrylic acid, then dried to a constant weight. The product was a graft copolymer of 91.6 percent by weight of polyethylene and 8.4 percent of acrylic acid.

(B) A blend of 90 grams of the graft copolymer described in part (A) of this example and 10 grams of a polyethylene of average molecular weight 1500 and a density of 0.92 was prepared by mechanically mixing the ingredients for 20 minutes on a two-roll compounding mill at temperatures of about 150° to 170° C. The polymeric mixture was cooled and ground to a powder of particles of sizes of 1000 microns or smaller.

(C) Test bars of iron, aluminum, stainless steel, brass, magnesium, and Pyrex glass, the dimensions of which were ¼ inch by 1 inch by 3 inches were coated with the blend of low molecular weight polyethylene-acrylic acid graft copolymer described in part (B) of this example.

The procedure consisted of, first, preheating the test bars to a temperature of 300° C. to 375° C. The preheated articles were then immersed in a fluid-bed of the polymeric blend for seven seconds followed by post-heatingat 165° C. to 180° C. for 10 minutes. The fluid bed consisted of the blend of low molecular weight polyethylene and polyethylene-acrylic acid graft copolymer having a particle size of 1000 microns or smaller. The fluidizing gas was nitrogen, at a supply pressure of about 1.8 p.s.i. and a temperature of 90° C. The thickness of the resulting coatings were about 0.010 inch. These coatings were absolutely free from pores, adherent to the metal surfaces, and smooth and of uniform thickness.

(D) The coated metal test bars described in part (C) of this example were subjected to each of the following tests designed to measure the resistance of the coatings to the effects of temperature change, impact resistance, and resistance to the corrosive action of solutions of acids and salts.

Test No. 1: Immersion of the test bar in a boiling 20 percent calcium chloride solution for three hours.

Test No. 2: Immersion of the coated test bar in concentrated hydrochloric acid for 72 hours at room temperature.

Test No. 3: Storage of the coated test bars in a Dry-Ice container for 72 hours following the testing described in Test No. 1 above. The test bars were struck with a hammer and examined visually for impact and corrosion resistance.

Test No. 4: Immersion of the coated test bars in a 20 percent calcium chloride solution for 246 hours at room temperature.

The metal test bars coated with the coating composition described in part (B) of this example were not affected by the tests. Similar test bars coated with high molecular weight polyethylene were vigorously attacked, resulting in a severe loss of impact resistance coating adhesion and were corroded by action of the acidic and salt solutions.

*Example 2*

A blend of 25 grams of the graft copolymer described in part (A) of Example No. 1 and 75 grams of a polyethylene of average molecular weight of about 1500 and a density of 0.92 was prepared as described in part (B) of Example No. 1. Test bars of iron, aluminum, stainless steel, brass, magnesium, and Pyrex glass, the dimensions of which were ¼ inch by 1 inch by 3 inches were coated with the blend of low molecular weight polyethylene and polyethylene-acrylic acid graft copolymer. The test bars were preheated to a temperature of 300° C. and the preheated articles immersed in a fluid-bed of the polymeric blend for seven seconds, followed by postheating at 175° C. for 10 minutes. The coating obtained was absolutely free from pore, adherent to the metal surfaces and smooth and of uniform thickness.

The coated metal test bars were tested as described in part (D) of Example 1 and were found to be unaffected by the tests.

*Example 3*

A blend of 40 grams of the graft copolymer described in part (A) of Example 1 and 60 grams of a polyethylene of average molecular weight of about 2000 and a density of 0.92 was prepared and coated on iron, aluminum, stainless steel, brass, magnesium, Pyrex glass, using procedures described in parts (B) and (C) of Example No. 1. The resultant coatings on the test bars are smooth and strongly adherent.

The coated test bars were tested as described in part (D) of Example No. 1, and were found to be unaffected by the tests.

*Example 4*

A blend of 40 grams of the graft copolymer described in part (A) of Example No. 1 and 60 grams of a polyethylene of molecular weight of about 5000 and density 0.92 was prepared and coated on iron, aluminum stainless steel, brass and aluminum bars using procedures described in parts (B) and (C) of Example No. 1. The resultant coatings on the test bars were smooth and strongly adherent.

The coated test bars were tested as described in part (D) of Example No. 1 and were found to be unaffected by the tests.

*Example 5*

A blend of 25 grams of the graft copolymer described in part (A) of Example No. 1 and 75 grams of a polyethylene of molecular weight of about 10,000 and density 0.92 was prepared and coated on iron, aluminum, stainless steel, brass and magnesium test bars using procedures described in parts (B) and (C) of Example No. 1. The resultant coatings are smooth and strongly adherent.

The coated test bars were tested as described in part (D) of Example No. 1, and were found to be unaffected by the tests.

*Example 6*

(A) Solid linear polyethylene having a melt index of 4 was irradiated in air with high speed electrons from a Van de Graaff generator operating at a beam current of 156 microamperes 2 mev. potential for a total dose of 1.6 megarads. The irradiated polyethylene was suspended in a solution of ortho xylene containing methacrylic acid in the ratio of 1.06 parts of methacrylic acid to 1 part of polyethylene. The graft polymerization was carried out as described in part (A) of Example No. 1. The resultant graft copolymer consisted essentially of 92 parts of polyethylene by weight of copolymer and 8 parts of methacrylic acid by weight of copolymer.

(B) A blend of 60 grams of the graft copolymer described in part (A) of this example of 40 grams of a polyethylene of average molecular weight 1500, and a density of 0.92 was prepared using procedures described in part (B) of Example No. 1.

(C) Test bars including iron, stainless steel, aluminum, brass, magnesium and Pyrex glass, the dimensions of which were ¼ inch by 1 inch by 3 inches were coated with the blend of low molecular weight polyethylene and polyethylene-methacrylic acid graft copolymer described in part (B) of this example, using coating procedures described in part (C) of Example No. 1.

A smooth coating free from pores, adherent to the metal surfaces, and smooth and of uniform thickness was obtained in all cases.

(D) The coated test bars described in part (C) of this example were tested as described in part (D) of Example No. 1.

None of the coated test bars were affected by the tests.

*Example 7*

A blend of 25 grams of the graft copolymer described in part (A) of Example No. 6, and 75 grams of a polyethylene of average molecular weight 10,000 and a density of 0.92 was prepared and coated on test bars as described in parts (B) and (C) of Example 6 and tested as described in part (D) of Example 1.

None of the test bars were affected by the tests.

*Example 8*

(A) Solid linear polyethylene having a melt index of 4 was irradiated in air with high speed electrons from a Van de Graaff generator operating at a beam current of 156 microamperes and 2 mev. potential for a total dose of 1.6 megarads. The irradiated polyethylene was suspended in a solution of ortho xylene containing acrylic acid in the ratio of 0.61 part acrylic acid to 1 part polyethylene. The graft polymerization was carried out in a glass reaction vessel equipped with a reflux condenser and stirrer and under a pre-purified nitrogen gas by heating the mixture for 1 hour. After completing the reaction, the product was separated by filtering and was washed with hot water to remove homopolymer and unreacted acrylic acid, then dried to a constant weight. The resultant graft copolymer consisted essentially of 97.7 parts of polyethylene by weight of copolymer and 2.3 parts of acrylic acid by weight of copolymer.

(B) A blend of 40 grams of the graft copolymer described in part (A) of this example and 60 grams of a polyethylene of average molecular weight 1500 and a density of 0.92 was prepared using procedures described in part (B) of Example No. 1.

(C) Test bars including iron, stainless steel, aluminum, brass, magnesium and Pyrex glass, the dimensions of which were ¼ inch by 1.0 inch by 3.0 inches were coated with the blend of low molecular weight polyethylene and polyethylene-acrylic acid graft copolymers described in part (B) of this example, using coating procedures described in part (C) of Example No. 1. A smooth coating free from pores, adherent to the metal surfaces and smooth and of uniform thickness was obtained for all metal bars tested.

(D) The coated test bars described in part (C) of this example were tested as described in part (D) of Example No. 1.

None of the coated test bars described in part (C) of this example were affected by the tests.

*Example 9*

A blend of 25 grams of the graft copolymer described in part (A) of Example 8, and 75 grams of a polyethylene of average molecular weight 10,000 and a density of 0.92 was prepared and coated on test bars as described in parts (B) and (C) of Example 8, and tested as described in part (D) of Example 1. None of the test bars were affected by the tests.

*Example 10*

(A) Solid linear polyethylene having a melt index of 4 was irradiated in air with high speed electrons from a Van de Graaff generator operating at a beam current of 156 microamperes and 2 mev. potential for a total dose of 1.6 megarads. The irradiated polyethylene was reacted with glacial acrylic acid and recovered as described in part (A) of Example 1. The resultant graft copolymer consisted essentially of 75 parts of polyethylene by weight of copolymer and 25 parts of acrylic acid by weight of copolymer.

(B) A blend of 90 grams of the graft copolymer described in part (A) of this example and 10 grams of a polyethylene of average molecular weight 1500, and a density of 0.92 was prepared using procedures described in part (B) of Example 1.

(C) Test bars including iron, stainless steel, aluminum, brass, magnesium and Pyrex glass, the dimension of which was ¼ inch by 1 inch by 3 inches, were coated with the blend of low molecular weight polyethylene and polyethylene-acrylic acid graft copolymer described in part (B) of this example, using coating procedure described in part (C) of Example 1. A coating free from pores, adherent to metal surfaces, and smooth and of uniform thickness was obtained in all cases.

(D) The coated test bars described in part (C) of this example were tested as described in part (D) of Example 1.

None of the coated test bars were affected by the tests.

*Example 11*

A blend of 25 grams of the graft copolymer described in part (A) of Example 10, and 75 grams of a polyethylene of average molecular weight 10,000 and a density of 0.92 was prepared and coated on test bars as described in parts (B) and (C) of Example 1, and tested as described in part (D) of Example 1. None of the test bars were affected by the tests.

This invention provides a method of preparing smooth coatings of uniform thickness, which have excellent adherence to articles, particularly metals, and which are resistant to the corrosive effects of solvents, chemicals, and mechanical abrasive or frictional wear.

We claim:

1. A thermoplastic composition of matter having a flow viscosity of at least 20 poise and not greater than 11,000 poise as measured at a temperature of 225° C. and a pressure of 700,000 dynes/cm.$^2$, said composition consisting essentially of an intimate blend of (I) a graft copolymer of (A) from 98 to 75 percent by weight of polyethylene, and (B) from 2 to 25 percent by weight of an unsaturated acid selected from the group consisting of acrylic acid and methacrylic acid; in admixture with (II) polyethylene having a molecular weight of from about 1500 to about 10,000, in amounts within the range of from about 25 to 75 percent by weight of the sum of the weight of the graft copolymer and the low molecular weight polyethylene.

2. A thermoplastic composition of matter having a flow viscosity of at least 20 poise and not greater than 11,000 poise as measured at a temperature of 225° C. and a pressure of 700,000 dynes/cm.$^2$, said composition consisting essentially of an intimate blend of (I) a graft copolymer of (A) from 98 to 75 percent by weight of polyethylene, and (B) from 2 to 25 percent by weight of an unsaturated acid selected from the group consisting of acrylic acid and methacrylic acid; in admixture with (II), polyethylene having a molecular weight of about 2000 to about 5000, said polyethylene being in proportions corresponding to from about 25 to 60 percent by weight of the sum of the weights of the graft copolymer and the low molecular weight polyethylene.

3. A thermoplastic composition of matter having a flow viscosity of at least 20 poise and not greater than 11,000 poise as measured at a temperature of 225° C. and a pressure of 700,000 dynes/cm.$^2$, said composition consisting essentially of an intimate blend of (I) a graft copolymer of (A) from 98 to 75 percent by weight of polyethylene, and (B) from 2 to 25 percent by weight of an unsaturated acid selected from the group consisting of acrylic acid and methacrylic acid; in admixture with (II) polyethylene having a molecular weight of about 10,000, said polyethylene being in proportions corresponding to from about 40 to 75 percent by weight of the sum of the weights of the graft copolymer and the low molecular weight polyethylene.

4. Method of preparing a thermoplastic composition of matter having a flow viscosity of at least 20 poise and not greater than 11,000 poise as measured at a temperature of 225° C. and a pressure of 700,000 dynes/cm.$^2$, comprising intimately incorporating (I) a graft copolymer of (A) from 98 to 75 percent by weight of polyethylene and (B) from 2 to 25 percent by weight of an unsaturated acid selected from the group of an acrylic acid and methacrylic acid, with (II), polyethylene having a molecular weight of from about 1500 to about 10,000 in amounts within the range of from about 25 to 75 percent by weight of the sum of the weights of the graft copolymer and the low molecular weight polyethylene; by heating and mechanically working said mixture at temperatures between its melting point and the decomposition point of the mixture, to form a homogeneous composition.

5. Method according to claim 4, wherein the low molecular weight polyethylene has a molecular weight of from about 2000 to about 5000, said polyethylene being in proportions corresponding to from about 25 to 60 percent by weight of the sum of the weights of the graft copolymer and the low molecular weight polyethylene.

6. Method according to claim 4, wherein the low molecular weight polyethylene has a molecular weight of about 10,000, said polyethylene being in proportions corresponding to from about 40 to 75 percent by weight of the sum of the weights of the graft copolymer and the low molecular weight polyethylene.

References Cited by the Examiner

UNITED STATES PATENTS

| | | | |
|---|---|---|---|
| 2,924,584 | 2/60 | Wolinski | 260—878 |
| 2,956,035 | 10/60 | Mock | 260—33.6 |
| 2,970,129 | 1/61 | Rugg et al. | 260—878 |
| 3,079,312 | 2/63 | Alsys | 260—878 |

MURRAY TILLMAN, *Primary Examiner.*

WILLIAM H. SHORT, *Examiner.*